United States Patent
Oh et al.

(10) Patent No.: US 12,062,756 B2
(45) Date of Patent: Aug. 13, 2024

(54) COMPOSITION FOR GEL POLYMER ELECTROLYTE, GEL POLYMER ELECTROLYTE PREPARED THEREFROM, AND LITHIUM SECONDARY BATTERY INCLUDING THE SAME

(71) Applicant: LG Chem, Ltd., Seoul (KR)

(72) Inventors: Jeong Woo Oh, Daejeon (KR); Kyoung Ho Ahn, Daejeon (KR); Chul Haeng Lee, Daejeon (KR); Jung Hoon Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 806 days.

(21) Appl. No.: 16/638,673

(22) PCT Filed: Nov. 30, 2018

(86) PCT No.: PCT/KR2018/015122
§ 371 (c)(1),
(2) Date: Feb. 12, 2020

(87) PCT Pub. No.: WO2019/108031
PCT Pub. Date: Jun. 6, 2019

(65) Prior Publication Data
US 2021/0194052 A1 Jun. 24, 2021

(30) Foreign Application Priority Data

Nov. 30, 2017 (KR) .................. 10-2017-0163719
Nov. 26, 2018 (KR) .................. 10-2018-0147637

(51) Int. Cl.
*H01M 10/0565* (2010.01)
*H01M 10/052* (2010.01)
*H01M 10/0567* (2010.01)

(52) U.S. Cl.
CPC ..... *H01M 10/0565* (2013.01); *H01M 10/052* (2013.01); *H01M 10/0567* (2013.01); *H01M 2300/0085* (2013.01)

(58) Field of Classification Search
None
See application file for complete search history.

(56) References Cited

U.S. PATENT DOCUMENTS

| 10,243,239 B1 | 3/2019 | Ahn et al. |
| 2010/0266905 A1 | 10/2010 | Jeon et al. |
| 2013/0302668 A1 | 11/2013 | Lim et al. |
| 2014/0248543 A1 | 9/2014 | Zhu et al. |
| 2015/0079480 A1 | 3/2015 | Ahn et al. |
| 2016/0028110 A1 | 1/2016 | Yu et al. |
| 2017/0217123 A1 | 8/2017 | Kataoka et al. |
| 2018/0062153 A1 | 3/2018 | Zhu et al. |
| 2018/0323471 A1 | 11/2018 | Ahn et al. |
| 2019/0363339 A1 | 11/2019 | Zhu et al. |

FOREIGN PATENT DOCUMENTS

| CN | 106797048 A | | 5/2017 | |
| EP | 3202565 A1 | | 8/2017 | |
| JP | 2002151093 A | * | 5/2002 | |
| JP | 2002251918 A | * | 9/2002 | |
| KR | 10-2006-0075970 A | | 7/2006 | |
| KR | 10-0788162 B1 | | 12/2007 | |
| KR | 10-2009-0030237 A | | 3/2009 | |
| KR | 10-2012-0022870 A | | 3/2012 | |
| KR | 10-2014-0008264 A | | 1/2014 | |
| KR | 10-2014-0099864 A | | 8/2014 | |
| KR | 10-2015-0014185 A | | 2/2015 | |
| KR | 10-2015-0050412 A | | 5/2015 | |
| KR | 10-2016-0040128 A | | 4/2016 | |
| KR | 10-2017-0034313 A | | 3/2017 | |
| WO | WO-2014115195 A1 | * | 7/2014 | .......... H01M 10/052 |
| WO | WO-2016053064 A1 | * | 4/2016 | .......... H01M 10/052 |

OTHER PUBLICATIONS

Machine translation of JP 2002-251918 A (Year: 2002).*
Extended European Search Report dated Apr. 24, 2020 issued by the European Patent Office in corresponding European patent application No. 18883233.1.

* cited by examiner

*Primary Examiner* — Robert S Carrico
(74) *Attorney, Agent, or Firm* — Morgan, Lewis & Bockius LLP

(57) ABSTRACT

The present invention provides a composition for a gel polymer electrolyte, a gel polymer electrolyte prepared using the same, and a lithium secondary battery, the composition including: an oligomer represented by Formula 1, an additive, a polymerization initiator, a lithium salt, and a non-aqueous solvent. The additive includes at least one compound selected from the group consisting of an imide-based compound, a compound having a Si—N-based bond, a nitrile-based compound, a phosphate-based compound, and a borate-based compound.

12 Claims, No Drawings

COMPOSITION FOR GEL POLYMER ELECTROLYTE, GEL POLYMER ELECTROLYTE PREPARED THEREFROM, AND LITHIUM SECONDARY BATTERY INCLUDING THE SAME

CROSS-REFERENCES TO RELATED APPLICATIONS

This application is a U.S. national phase application, pursuant to 35 U.S.C. 371, of PCT/KR2018/015122, filed Nov. 30, 2018, designating the United States, which claims priority to Korean Patent Application No. 10-2017-0163719, filed on Nov. 30, 2017 and Korean Patent Application No. 10-2018-0147637, filed Nov. 26, 2018. The entire contents of the aforementioned patent applications are incorporated herein by this reference.

TECHNICAL FIELD

The present invention relates to a composition for a gel polymer electrolyte, a gel polymer electrolyte prepared therefrom, and a lithium secondary battery including the same, and more particularly, to a composition for a gel polymer electrolyte having improved battery safety by suppressing side reaction caused by a lithium salt, a gel polymer electrolyte prepared therefrom, and a lithium secondary battery including the same.

BACKGROUND ART

Demands for secondary batteries as an energy source have been significantly increased as technology development of and demands for mobile devices have increased, and among such secondary batteries, lithium secondary batteries having high energy density and voltage have been commercialized and widely used.

A lithium metal oxide is used as a positive electrode active material of a lithium secondary battery, and a lithium metal, a lithium alloy, crystalline or amorphous carbon, or a carbon composite is used as a negative electrode active material. A lithium secondary battery is produced by a process in which an electrode assembly is prepared by coating a current collector with an active material to an appropriate thickness and length or coating an active material itself to have a film shape, and then winding or laminating the resultant product together with an insulating separator, then the electrode assembly is accommodated into a container such as a can or a pouch, and an electrolyte is then injected into the container.

An electrolyte applied to a lithium secondary battery is mainly classified into a liquid electrolyte, a gel polymer electrolyte, and a solid polymer electrolyte, and it is typically known that the safety of a battery increases but battery performance decreases in the following order: liquid electrolyte<gel polymer electrolyte<solid polymer electrolyte. Currently, it is known that the solid polymer electrolyte is not commercially available yet due to its inferior battery performance.

A variety of non-aqueous organic solvents are used in an electrolyte, propylene carbonate (PC) has been conventionally used as a double non-aqueous organic solvent, but there was a problem that an irreversible decomposition reaction with a graphite material may occur. In order to replace the propylene carbonate, two-/three-component non-aqueous organic solvent including ethylene carbonate (EC) has been used. However, the ethylene carbonate has a high melting point, and thus has a limited workable temperature, and there is a problem that battery performance may be significantly deteriorated at a low temperature.

Meanwhile, containing moisture within a lithium secondary battery may cause deterioration of the battery performance. In a lithium secondary battery, moisture may be contained inside an active material during the manufacturing process, or may be contained in a very small amount in an electrolyte. For example, the lithium-titanium oxide used as a negative electrode active material is a zero-strain material due to an extremely low structural change during charging and discharging, and has excellent lifetime characteristics. Further, the lithium-titanium oxide forms a relatively high voltage band, and generates no dendrites, and thereby is known as a material having excellent safety and stability. In addition, the lithium-titanium oxide has an advantage of having electrode characteristics for rapid charging, that allows charging to be completed within a few minutes, but has a disadvantage of having the property of absorbing moisture in the air. Thus, when an electrode is manufactured using the lithium-titanium oxide, the moisture contained in the electrode is decomposed to generate a large amount of gas.

In addition, the moisture present in the electrolyte may react with the electrolyte by potential energy provided during the charging process to thereby generate a gas, and at this time, cells are swollen, resulting in deterioration in the reliability of the battery. For example, $LiPF_6$, which is one of the lithium salts, reacts with water to form HF which is a strong acid, which may react spontaneously with an electrode active material exhibiting weak basicity. When the electrode active material component is eluted by the reaction, the battery performance is deteriorated and lithium fluoride (LiF) is formed on the surface of the positive electrode to act as an electrical resistance in the electrode, and causes the lifetime of the battery to be shortened. Thus, it is necessary to inhibit the formation of HF in the electrolyte and to prevent the HF from causing a side reaction.

(Patent document 1) Korean Patent Application Laid-open Publication No. 10-2009-0030237

DISCLOSURE OF THE INVENTION

Technical Problem

To solve the above-described problem, the present invention provides a composition for gel polymer electrolyte, a gel polymer electrolyte prepared therefrom, and a lithium secondary battery including the same, wherein the composition allows the lithium secondary battery to have constant performances and also to have an improved safety, by suppressing the formation of HF which is an impurity derived from negative ions of a lithium salt during charging, and by reducing a side reaction.

Technical Solution

In an aspect, the present invention provides a composition for a gel polymer electrolyte including an oligomer represented by Formula 1 below, an additive, a polymerization initiator, a lithium salt, and a non-aqueous solvent.

The additive includes at least one compound selected from the group consisting of an imide-based compound, a compound having a Si—N-based bond, a nitrile-based compound, a phosphate-based compound, and a borate-based compound.

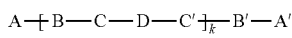

[Formula 1]

In Formula 1,

A and A' are each independently a unit including a (meth)acrylate group,

B and B' are each independently a unit including an amide group,

C and C' are each independently including an oxyalkylene group,

D is a unit including a siloxane group, and k is an integer of 1 to 100.

Meanwhile, the imide-based compound, may include a carbodiimide-based compound represented by Formula 2 below.

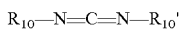

[Formula 2]

In Formula 2, $R_{10}$ and $R_{10}'$ are each independently one selected from the group consisting of an alkyl group having 1 to 12 carbon atoms and a cycloalkyl group having 3 to 12 carbon atoms.

The compound having a Si—N-based bond may include a compound represented by Formula 3 below

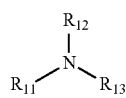

[Formula 3]

In Formula 3, $R_{11}$ may be hydrogen or a silyl group in which an alkyl group having 1 to 5 carbon atoms is substituted or unsubstituted, $R_{12}$ and $R_{13}$ are each independently one selected from the group consisting of hydrogen, a substituted or unsubstituted alkyl group having 1 to 5 carbon atoms, a hetero-atom-substituted or unsubstituted alkyl group having 1 to 5 carbon atoms, and a silyl group in which an alkyl group having 1 to 5 carbon atoms is substituted or unsubstituted, and the hetero-atom may be one selected from the group consisting of oxygen (O), nitrogen (N), and sulfur (S).

In addition, the nitrile-based compound may include at least one compound selected from the group consisting of compounds represented by Formulae 4-1 and 4-2 below.

[Formula 4-1]

In Formula 4-1, $R_{14}$ is one selected from the group consisting of a substituted or unsubstituted alkyl group having 1 to 5 carbon atoms and a substituted or unsubstituted alkenyl group having 1 to 5 carbon atoms.

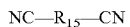

[Forumla 4-2]

In Formula 4-2, $R_{15}$ is one selected from the group consisting of a substituted or unsubstituted alkylene group having 1 to 5 carbon atoms and a substituted or unsubstituted alkenyl group having 1 to 5 carbon atoms.

In addition, the phosphate-based compound may include at least one compound selected from the group consisting of tris(trimethylsilyl)phosphate and tris(trimethyl)phosphate.

Meanwhile, the borate-based compound may include at least one compound selected from the group consisting of lithium tetrafluoroborate and tris (trimethylsilyl)borate.

In addition, the oligomer according to the present invention may include at least one compound selected from the group consisting of compounds represented by Formula 1-1 to 1-5.

[Formula 1-1]

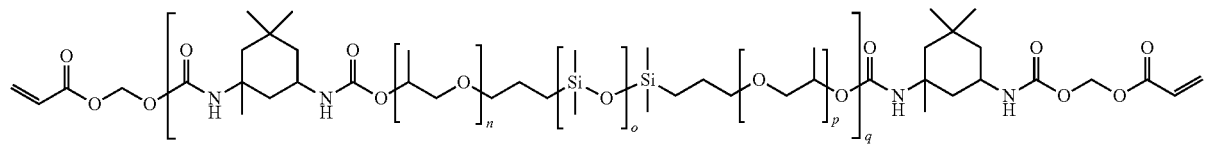

[Formula 1-2]

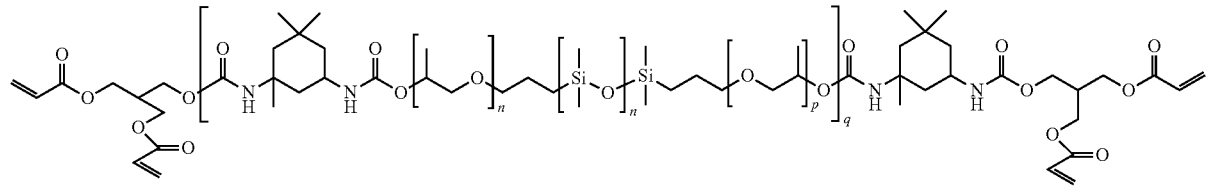

[Formula 1-3]

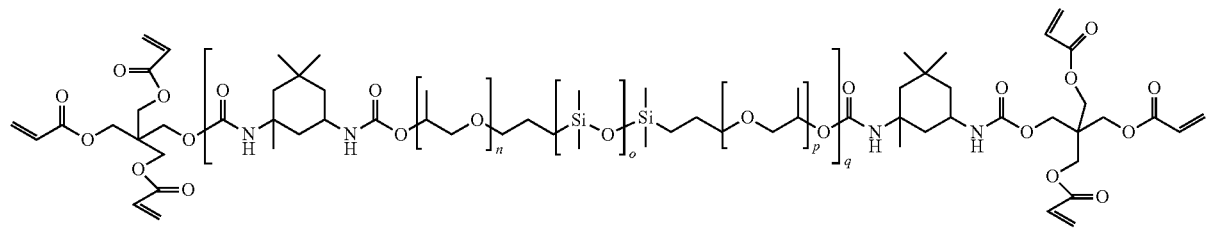

[Formula 1-4]

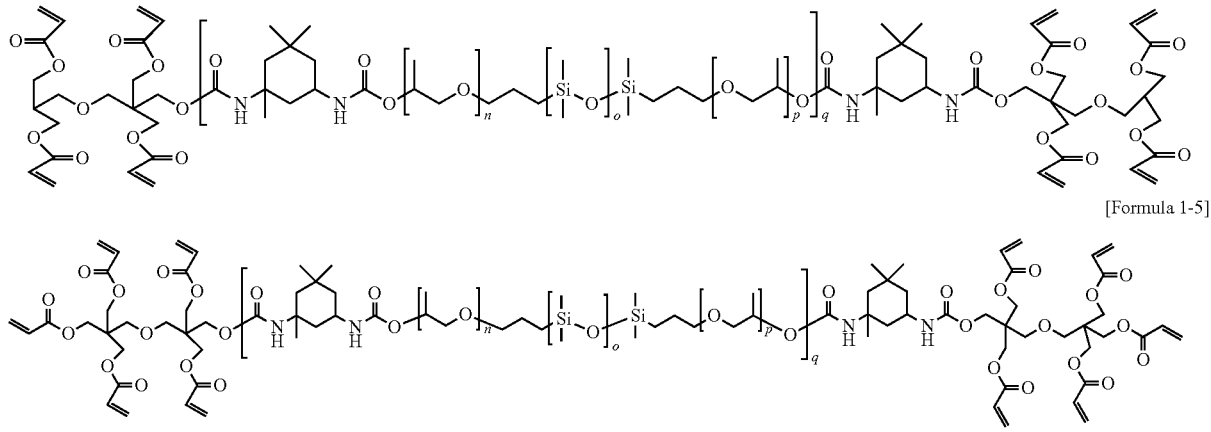

[Formula 1-5]

In Formulae 1-1 to 1-5, n, o, and p are each independently an integer of 1 to 30, and q is an integer of 1 to 100.

In another aspect, the present invention provides a gel polymer electrolyte prepared using the composition for a gel polymer electrolyte and a lithium secondary battery including the same.

Advantageous Effects

A positive electrode active material may be prevented from eluting by suppressing the formation of HF, which is an impurity produced while an electrolyte is formed using a composition for a gel polymer electrolyte according to the present invention, thereby maintaining the battery capacity at a certain level or more.

Furthermore, a battery having improved battery performance and safety may be achieved by suppressing the decomposition of a non-aqueous solvent constituting an electrolyte due to the reaction between HF and the electrolyte, or suppressing the occurrence of the side reaction with an electrode.

Best Mode for Carrying Out the Invention

Hereinafter, the present invention will be described in more detail for understanding of the present invention.

It will be understood that terms or words used in the description and claims should not be construed as a general or dictionary definition but are to be construed as a meaning and concepts that accord with the technical spirits of the present invention based on a principle that the inventors may properly define the concepts of terms in order to describe their own invention in best mode.

The terms used herein is for the purpose of describing exemplary embodiments only and is not intended to be limiting of the present invention. The singular expressions include the plural expressions, unless the context clearly means otherwise.

It will be understood that the terms "include", "provided with" or "have" when used in the description, specify the presence of stated features, numerals, steps, elements, or the combination thereof, but do not preclude the presence or addition of one or more other features, numerals, steps, elements, or the combination thereof.

Meanwhile, "*" used in the description means a connected part between the same or different atoms or between the terminal parts of a formula unless otherwise indicated herein.

Composition for Gel Polymer Electrolyte

The composition for a gel polymer electrolyte according to the present invention includes an oligomer; an additive; a polymerization initiator; a lithium salt; and a non-aqueous solvent.

Oligomer

First, the oligomer will be explained. The oligomer may be three-dimensionally combined to form a polymer network through polymerization reaction, and may include a (meth)acrylate group, an amide group, an oxyalkylene group, and a siloxane group.

According to types of an electrolyte used, a lithium secondary battery may be classified into a lithium secondary battery using a liquid electrolyte, and lithium polymer battery using a polymer electrolyte. Conventionally, a liquid electrolyte, particularly, an ion conductive liquid electrolyte in which a lithium salt is dissolved in a non-aqueous organic solvent, has been generally used.

However, as interests in energy storage technologies have increased, there is a need to develop a secondary battery which is compact and light weight and also capable of charging and discharging with high-capacity performances, and which has high-temperature and high-voltage safety as well. Accordingly, development of a battery using a gel polymer electrolyte composed of a gel polymer rather than composed of a liquid electrolyte has been spotlighted recently.

Generally, it is known that the safety of a battery increases but battery performance decreases in the following order: liquid electrolyte<gel polymer electrolyte<solid polymer electrolyte.

In other words, the gel polymer electrolyte has a disadvantage of having a lower lithium-ion conductivity than a liquid electrolyte composed only of an electrolytic solution.

Thus, in order to solve such problems, the present invention uses a gel polymer electrolyte including a polymer network formed by three-dimensionally combining the oligomers. When a gel polymer electrolyte formed by combining the oligomers, the degree of freedom of lithium ions is increased by the negative ion immobilization and stabilization, thereby reducing the electric resistance, and achieving high lithium-ion conductivity. In addition, the polymer network formed from the oligomers has low volatility even at high temperature due to high thermal resistance and high-temperature durability, and thus exhibits high electrochemical stability. Thus, even when a lithium secondary battery is used in a high-temperature environment, or even when the temperature inside the battery rises while the battery operates, high-temperature the safety of the battery may be improved since it is possible to control the amount of heat generation, and to prevent ignition from occurring.

The oligomer may be represented by Formula 1 below

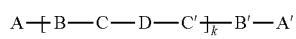
[Formula 1]

In Formula 1,

Each of A and A' is independently a unit including a (meth)acrylate group, each of B and B' is independently a unit including an amide group, each of C and C' is independently a unit including an oxyalkylene group, and D is a unit including a siloxane group, and k is an integer of 1 to 100.

Meanwhile, k may preferably be an integer of 1 to 50, and more preferably an integer of 1 to 30. When k is in the range, the oligomer represented by Formula 1 has a suitable weight-average molecular weight (Mw).

A weight-averaged molecular weight herein may mean a conversion value in terms of standard polystyrene as measured by gel permeation chromatograph (GPC), and unless otherwise specified, a molecular weight may mean a weight-averaged molecular weight. The weight-averaged molecular weight may be measured by gel permeation chromatograph (GPC). For example, a sample specimen with a certain concentration is prepared, and thereafter a GPC measurement system alliance 4 instrument is stabilized. Once the instrument is stabilized, a standard specimen and a sample specimen are injected into the instrument to obtain chromatogram, and then the weight-averaged molecular weight is calculated (system: Alliance 4, column: Ultrahydrogel linear x 2, eluent: 0.1M $NaNO_3$ (pH 7.0 phosphate buffer, flow rate: 0.1 mL/min, temp: 40° C., injection: 100 μL)

The weight-averaged molecular weight (Mw) of an oligomer represented by Formula 1 may be controlled by the number of repeating units, and may be 1,000 to 20,000, particularly 1,000 to 15,000, and more particularly 1,000 to 10,000. When the weight-averaged molecular weight of the oligomer is within the above range, it is possible to prepare a gel polymer electrolyte effectively which may improve the mechanical strength of a battery including the same, and enhance the processability (formability) and stability of the battery, or the like Meanwhile, the units A and A' are units including a (meth)acrylate group such that oligomers are combined into a three-dimensional structure to form a polymer network. The units A and A' may be derived from a monomer that includes, within a molecular structure, at least one monofunctional or polyfunctional (meth)acrylate or (meth)acrylic acid.

For example, the units A and A' may each independently include at least one unit represented by Formulae A-1 to A-5 below.

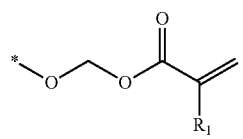
[Formula A-1]

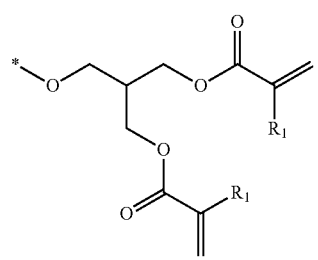
[Formula A-2]

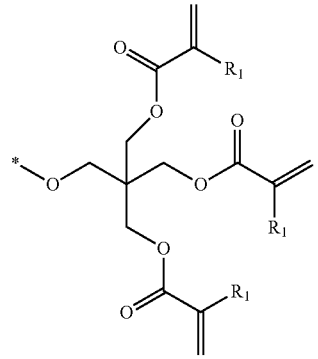
[Formula A-3]

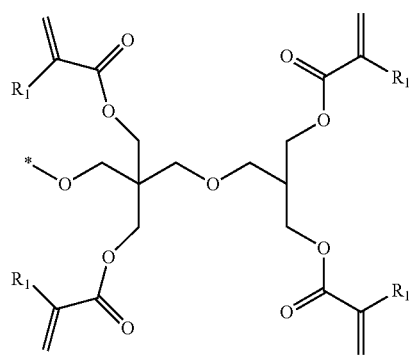
[Formula A-4]

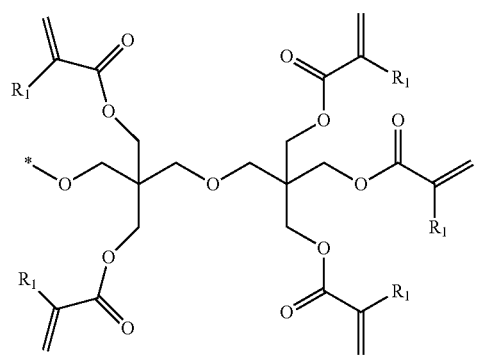
[Formula A-5]

In Formulae A-1 to A-5, $R_1$ may each independently be one selected from the group consisting of hydrogen, and a substituted or unsubstituted alkylene group having 1 to 6 carbon atoms.

In addition, the units B and B' are each independently a unit including an amide group and are used for controlling ion transfer properties and imparting mechanical properties and adhesion in order to achieve a gel polymer electrolyte using the oligomer. In addition, when an amide group is included, the performance of the gel polymer electrolyte formed by the oligomer may be improved by stabilizing of negative ions generated by the side reaction of HF, and by suppressing of the generation of HF.

For example, the units B and B' may each independently include a unit represented by Formula B-1 below.

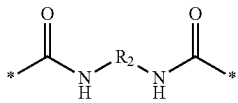

[Formula B-1]

In Formula B-1, $R_2$ is at least one selected from the group consisting of a linear or nonlinear alkylene group having 1 to 10 carbon atoms, a substituted or unsubstituted cycloalkylene group having 3 to 10 carbon atoms, a substituted or unsubstituted bicycloalkylene group having 6 to 20 carbon atoms, a substituted or unsubstituted aryl group having 6 to 20 carbon atoms, a unit represented by Formula $R_2$-1 below, and a unit represented by Formula $R_2$-2 below.

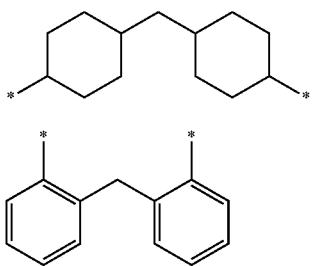

[Formula $R_2$-1]

[Formula $R_2$-2]

As another example, in Formula B-1, $R_2$ may include at least one unit represented by Formulae $R_2$-3 to $R_2$-8 below.

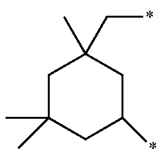

[Formula $R_2$-3]

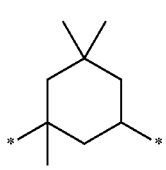

[Formula $R_2$-4]

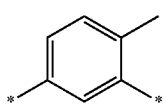

[Formula $R_2$-5]

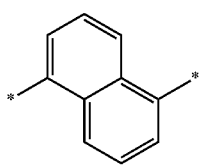

[Formula $R_2$-6]

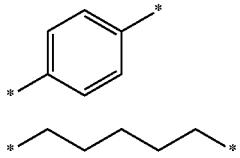

[Formula $R_2$-7]

[Formula $R_2$-8]

In addition, the units C and C' are each independently a unit including an oxyalkylene group to dissociate salts in the polymer network and to increase affinity with a surface having high polarity in a battery. More specifically, the units C and C' are used for controlling impregnability of a solvent, electrode affinity, and ion transfer capacity.

The units C and C' may each independently include a unit represented by Formula C-1 below.

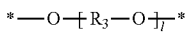

[Formula C-1]

In Formula C-1, $R_3$ is a substituted or unsubstituted, linear or nonlinear alkylene group having 1 to 10 carbon atoms, and l is an integer of 1 to 30.

Specifically, in Formula C-1, $R_3$ may be —$CH_2CH_2$— or —$CHCH_3CH_2$—.

In addition, the unit D is a unit including a siloxane group for controlling mechanical properties and affinity with separator. Specifically, it is possible to form a structure for securing flexibility besides a rigid structure region achieved by an amide bond in a polymer network, and to improve the affinity with a polyolefin-based separator fabric using the low polarity. In particular, when the affinity with the polyolefin-based separator fabric is improved, an effect of further enhancing an ionic conductivity due to a decrease of resistance may be achieved as well. Meanwhile, when a siloxane group is included, the performance of the gel polymer electrolyte including the oligomer may be improved by stabilizing of negative ions generated by HF, and by suppressing the generation of HF.

For example, the unit D may include a unit represented by Formula D-1.

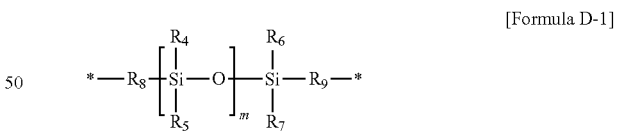

[Formula D-1]

In Formula D-1, $R_8$ and $R_9$ are a linear or nonlinear alkylene group having 1 to 5 carbon atoms, $R_4$, $R_5$, $R_6$ and $R_7$ are each independently hydrogen, an alkyl group having 1 to 5 carbon atoms or an aryl group having 6 to 12 carbon atoms, and m is an integer of 1 to 500.

Meanwhile, more preferably, m may be an integer of 10 to 500. When m satisfies the above range, the polarity of the oligomer may be decreased to improve the wetting property of the battery, and the formation of lithium dendrite on the electrode is suppressed by controlling the chemical reaction with the lithium metal, thereby improving the safety of the battery.

Specifically, the unit D represented by the Formula D-1 may be a unit represented by Formula D-2 below.

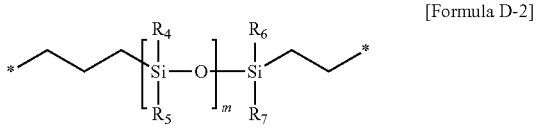
[Formula D-2]

In Formula D-2, $R_4$, $R_5$, $R_6$, and $R_7$ are each independently hydrogen, and an alkyl group having 1 to 5 carbon atoms or an aryl group having 6 to 12 carbon atoms, where, m may be an integer of 1 to 500, and more preferably an integer of 10 to 500.

More particularly, the unit D represented by the Formula D-2 may include one among the units represented by Formulae D-3 and D-4 below.

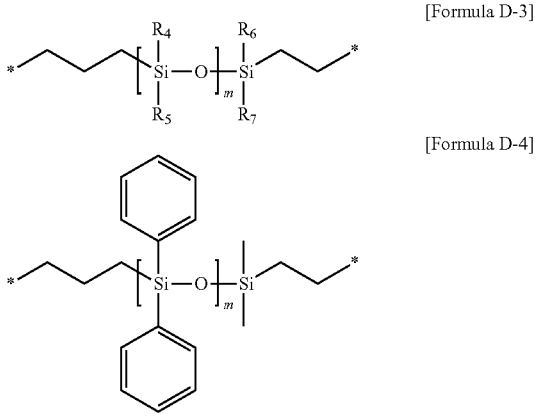
[Formula D-3]

[Formula D-4]

In Formula D-3 and Formula D-4, m is each an integer of 1 to 500. More preferably, m may be an integer of 10 to 500. When m satisfies the above range, the flame-retardant property of the gel polymer electrolyte prepared using the oligomer containing the unit may be improved, and the chemical reaction with the lithium metal electrode may be controlled, thereby improving the stability of the battery.

Meanwhile, the oligomer may be included in an amount of 0.5 to 20 parts by weight, preferably 1.0 to 20 parts by weight, and more preferably 1.5 to 20 parts by weight with respect to 100 parts by weight of the composition for a gel polymer electrolyte. When the content of the oligomer is less than 0.5 parts by weight, a network reaction between the oligomers for forming the gel polymer electrolyte may be difficult to occur; and when the content of the oligomer is greater than 20 parts by weight, the viscosity of the gel polymer electrolyte exceeds a certain level, and therefore, the impregnability, wetting property, and electrochemical stability in the battery may be degraded.

Additive

Next, an additive will be explained.

In the present invention, an additive may include at least one compound selected from the group consisting of an imide-based compound, a compound having a Si—N-based bond, a nitrile-based compound, a phosphate-based compound, and a borate-based compound.

The gel polymer electrolyte composition includes a lithium salt and a non-aqueous solvent in addition to an oligomer, and generally, a fluoride-based lithium salt having a high ionic conductivity is widely used as a lithium salt. However, negative ions generated by the chemical reaction of a fluoride-based lithium salt react with a trace amount of moisture to produce by-products such as HF, and such by-products may cause decomposition of the organic solvent and electrode side reaction, thereby continuously deteriorating the performance of the battery. The high-temperature storability of a secondary battery may also be deteriorated due to the negative ions and the by-products.

More specifically, for example, when $LiPF_6$ is used as a lithium salt, a $PF_6^-$, which is a negative ion, loses electrons on a negative electrode side thereby resulting in $PF_5$. The chemical reactions shown below may proceed as a chain reaction.

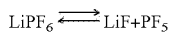

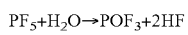

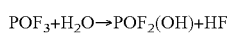

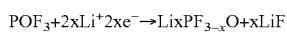

When the chain-reaction proceeds, the decomposition of the organic solvent or the side reaction with the electrode may occur due to other by-products including HF being generated, thereby continuously deteriorating the performance of the battery.

In order to suppress such a side reaction, a method for removing moisture present in the electrolyte, a method for suppressing the generation of HF by using an HF scavenger, a method for immobilizing and stabilizing negative ions generated from a lithium salt or the like may be used.

For example, since the imide-based compound and the compound having the Si—N-based bond may remove moisture in the electrode by immobilizing $H_2O$ as in the reaction mechanism below, and may control the reaction with the negative ions generated from the lithium salt in the electrolyte, the generation of HF may be suppressed.

[Reaction mechanism]

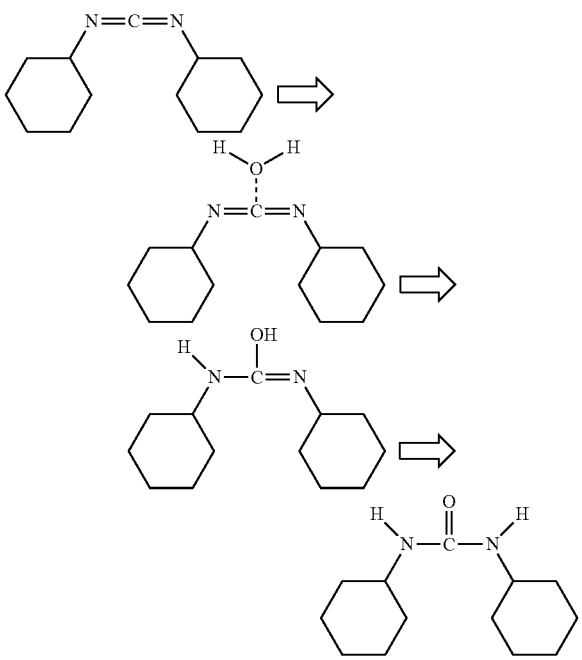

Meanwhile, HF may be generated during formation of a gel polymer electrolyte using the oligomer according to the present invention together with additives, the HF may collapse the polymer structure, and thus an electrolyte may not be formed appropriately. In particular, when the additives are used together, the gel polymer electrolyte may be easily formed by suppressing the generation of HF and stabilizing negative ions generated by HF. In addition, during the storage of the prepared gel polymer electrolyte at room temperature, the generation of HF is inhibited to prevent the gel polymer from being damaged, to allow the mechanical properties to be maintained at a certain level or more.

Specifically, the imide-based compound may include a carbodiimide-based compound represented by Formula 2 below.

$$R_{10}-N=C=N-R_{10'} \quad \text{[Formula 2]}$$

In Formula 2, $R_{10}$ and $R_{10}'$ are each independently one selected from the group consisting of an alkyl group having 1 to 12 carbon atoms and a cycloalkyl group having 3 to 12 carbon atoms.

More preferably, the imide-based compound may include at least one compound selected from the group consisting of N,N'-dicyclopentylcarbodiimide, N,N'-dicyclohexylcarbodiimide and N,N'-dicycloheptylcarbodiimide, but is not limited thereto.

In addition, the compound having a Si—N-based bond may include a compound represented by Formula 3 below.

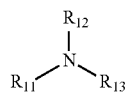

[Formula 3]

In Formula 3, $R_{11}$ may be hydrogen or a silyl group in which an alkyl group having 1 to 5 carbon atoms is substituted or unsubstituted, $R_{12}$ and $R_{13}$ are each independently one selected from the group consisting of hydrogen, a substituted or unsubstituted alkyl group having 1 to 5 carbon atoms, a hetero-atom-substituted or unsubstituted alkyl group having 1 to 5 carbon atoms, and a silyl group in which an alkyl group having 1 to 5 carbon atoms is substituted or unsubstituted, and the hetero-atom may be one selected from the group consisting of oxygen (O), nitrogen (N), and sulfur (S).

Specifically, the compound represented by Formula 3 may include at least one compound selected from the group consisting of 1,1,1,3,3,3-hexamethyldisilazane, heptamethyldisilazane, N,N-diethylaminotrimethylsilane and N,N,O-tris(trimethylsilyl)hydroxyamine.

More preferably, the compound having the Si—N-based bond may be 1,1,3,3,3-hexamethyldisilazane, but is not limited thereto.

As another example, the nitrile-based compound may immobilize and stabilize the lithium salt negative ions in the battery due to an unshared electron pair present in the nitrile.

Particularly, the nitrile-based compound may include at least one compound selected from the group consisting of compounds represented by Formulae 4-1 and 4-2.

$$NC-R_{14} \quad \text{[Formula 4-1]}$$

In Formula 4-1, $R_{14}$ is one selected from the group consisting of a substituted or unsubstituted alkyl group having 1 to 5 carbon atoms and a substituted or unsubstituted alkenyl group having 1 to 5 carbon atoms.

$$NC-R_{15}-CN \quad \text{[Formula 4-2]}$$

In Formula 4-2, $R_{15}$ is one selected from the group consisting of a substituted or unsubstituted alkylene group having 1 to 5 carbon atoms and a substituted or unsubstituted alkenyl group having 1 to 5 carbon atoms.

Specifically, the nitrile-based compound may include at least one compound selected from the group consisting of adiponitrile, succinonitrile, glutaronitrile, pimelonitrile, hept-3-ene dinitrile, suveronitrile, sebaconitrile, butyronitrile, and hex-3-ene dinitrile.

More preferably, the compound represented by Formulae 4-1 and 4-2 may be succinonitrile, but is not limited thereto.

Meanwhile, the phosphate-based compound and the borate-based compound act as a HF scavenger to suppress the generation of HF. More specifically, negative ions or byproducts (for example, $PF_6^-$ or $PF_5$) generated from the lithium salt act as a Lewis base, and the phosphate-based compound and the borate-based compound act as a Lewis acid. The negative ions and the by-products may be stabilized by the Lewis acid-base reaction to suppress the chain reaction.

Specifically, the phosphate-based compound may include at least one compound selected from the group consisting of tris(trimethylsilyl)phosphate and tris(trimethyl)phosphate.

In addition, the borate-based compound may include at least one compound selected from the group consisting of lithium tetrafluoroborate and tris(trimethylsilyl)borate.

Meanwhile, the additive may be included in an amount of 0.1 to 30 parts by weight, more preferably 0.1 to 10 parts by weight with respect to 100 parts by weight of a composition for a gel polymer electrolyte. When the content of the additive satisfies the above-mentioned range, the gel polymer structure may be maintained by stabilizing the negative ion without deteriorating battery performance.

Polymerization Initiator

Next, the polymerization initiator will be explained.

The polymerization initiator is for polymerizing the oligomer of the present invention to form a polymer network configured in a three-dimensional structure, and a conventional polymerization initiator known in the art may be used without limitation. A photopolymerization initiator or a thermal polymerization initiator may be used as the polymerization initiator according to the polymerization method.

Specifically, representative examples of the photopolymerization initiator may include at least one compound selected from the group consisting of 2-hydroxy-2-methylpropiophenone (HMPP), 1-hydroxy-cyclohexylphenyl-ketone, benzophenone, 2-hydroxy-1-[4-(2-hydroxyethoxy)phenyl]-2-methyl-1-propanone, oxy-phenylacetic acid 2-[2-oxo-2-phenyl-acetoxy-ethoxy]-ethyl ester, oxy-phenylacetic 2-[2-hydroxyethoxy]-ethyl ester, alpha-dimethoxy-alpha-phenyl acetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphosphine oxide, bis(eta 5-2,4-cyclopentadien-1-yl), bis[2,6-difluoro-3-(1H-pyrrol-1-yl)phenyl]titanium, 4-isobutylphenyl-4'-methylphenyl iodonium, hexafluorophosphate, and methyl benzoylformate.

In addition, representative examples of the thermal polymerization initiator may include at least one compound selected from the group consisting of benzoyl peroxide, acetyl peroxide, dilauryl peroxide, di-tert-butyl peroxide, t-butyl peroxy-2-ethyl-hexanoate, cumyl hydroperoxide, hydrogen peroxide, 2,2'-azobis(2-cyanobutane), 2,2'-azobis (methylbutyronitrile), 2,2'-azobis(iso-butyronitrile) (AIBN), and 2,2'-azobisdimethyl-valeronitrile (AMVN).

The polymerization initiator may be decomposed in a battery by heat at a temperature of 30° C. to 100° C. or by light such as UV light at room temperature (5° C. to 30° C.) to form radicals, and may form cross-linking by free radical polymerization, thereby allowing oligomers to be polymerized.

Meanwhile, with respect to 100 parts by weight of an oligomer, the polymerization initiator may be used in an amount of 0.01 to 5 parts by weight, preferably, 0.05 to 5 parts by weight, more preferably 0.1 to 5 parts by weight. When the content of a polymerization initiator is used within the range, and the amount of an unreacted polymerization initiator which may adversely affect battery performance may be minimized. In addition, when the polymerization is included within the above range, gelation may be appropriately performed.

Lithium Salt

Next, the lithium salt will be explained.

The lithium salt is used as an electrolyte salt in a lithium secondary battery, and is used as a medium for transferring ions. Typically, the lithium salt may include at least one compound selected from the group consisting of $LiPF_6$, $LiBF_4$, $LiSbF_6$, $LiAsF_6$, $LiClO_4$, $LiN(C_2F_5O_2)_2$, $LiN(CF_3SO_2)_2$, $CF_3SO_3Li$, $LiC(CF_3SO_2)_3$, $LiC_4BO_8$, LiTFSI, LiFSI, and $LiClO_4$, and may preferably include $LiPF_6$, but is not limited thereto.

Meanwhile, the lithium salt may be included in an amount of 0.5 to 5 M, and preferably 0.5 to 4 M. When the content of the lithium salt is less than the above range, charging and discharging of the battery may not be performed properly, and when the content of the lithium salt exceeds the above range, the viscosity of the gel polymer electrolyte may be increased and wetting property in the battery may be deteriorated, thereby degrading battery performance.

Non-Aqueous Solvent

Next, the non-aqueous solvent will be explained.

In the present invention, a non-aqueous solvent is an electrolyte solvent, which is commonly used in a lithium secondary battery, as the non-aqueous solvent, for example, an ether, an ester (acetates, propionates), an amide, a linear carbonate or a cyclic carbonate, and a nitrile (acetonitrile, SN, etc.), may be used in a mixture of at least two thereof or alone.

Among them, a carbonate-based electrolyte solvent including a cyclic carbonate, a linear carbonate or a carbonate compound which is a mixture thereof, may be used representatively.

Specific examples of the cyclic carbonate compound are a single compound a mixture including at least two compounds selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and halides thereof. In addition, as specific examples of the linear carbonate compound, a compound or a mixture including at least two compounds selected from the group consisting of dimethyl carbonate (DMC), diethyl carbonate (DEC), dipropyl carbonate (DPC), ethylmethyl carbonate (EMC), methylpropyl carbonate, and ethyl propyl carbonate (EPC), may representatively be used, but is not limited thereto.

Particularly, among the carbonate-based electrolyte solvents, a propylene carbonate and an ethylene carbonate, which are cyclic carbonates, are organic solvents having high viscosity and have a high dielectric constant and cause lithium salts in an electrolyte to be dissociated well, and therefore the propylene carbonate and the ethylene carbonate may preferably be used. In addition, when a linear carbonate, such as ethyl methyl carbonate, diethyl carbonate or dimethyl carbonate, having low viscosity and low dielectric constant, is mixed and used in an appropriate amount with the cyclic carbonate, an electrolyte having a high electrical conductivity may be obtained, and therefore the propylene carbonate and ethylene carbonate may be more preferably used.

In addition, among the electrolyte solvent, the ester may employ a single compound or a mixture including at least two selected from the group consisting of methyl acetate, ethyl acetate, propyl acetate, methyl propionate, ethyl propionate, γ-butyrolactone, γ-valerolactone, γ-caprolactone, α-valerolactone, and ε-caprolactone, but is not limited thereto.

Other than the components described above, the composition for a gel polymer electrolyte according to an embodiment of the present invention may optionally further include other additives, inorganic particles, and the like, which are capable of achieving properties known in the art, in order to impart effects of increasing the efficiency of polymer network formation reaction of the oligomer and decreasing resistance.

As the other additives, for example, additives such as vinylene carbonate (VC), vinyl ethylene carbonate (VEC), propane sultone (PS), succinonitrile (SN), adiponitrile (AdN), ethylene sulfate (ESa), propene sultone (PRS), fluoroethylene carbonate (FEC), $LiPO_2F_2$, Lithium difluorooxalatoborate (LiODFB), lithium bis-(oxalato)borate (LiBOB), 3-trimethoxysilanyl-propyl-N-aniline (TMSPa), tris (trimethylsilyl) phosphite (TMSPi), and $LiBF_4$ are applicable.

In addition, as the inorganic particles, a single compound or a mixture including at least two selected from the group consisting of $BaTiO_3$ having dielectric constant of 5 or more, $BaTiO_3$, $Pb(Zr,Ti)O_3$ (PZT), $Pb_{1-a}La_aZr_{1-b}Ti_bO_3$ (PLZT, where $0<a<1$, $0<b<1$), $Pb(Mg_{1/3}Nb_{2/3})O_3$-$PbTiO_3$ (PMN—PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, and a mixture thereof, may be used.

Besides the listed above, inorganic particles having lithium ion transfer ability, for example, lithium phosphate ($Li_3PO_4$), lithium titanium phosphate ($Li_cTi_d(PO_4)_3$, $0<d<2$, $0<d<3$), lithium aluminum titanium phosphate ($Li_{a1}Al_{b1}Ti_{c1}(PO_4)_3$, $0<a1<2$, $0<b1<1$, $0<c1<3$), (LiAlTiP)a2Ob2-based glass ($0<a2<4$, $0<b2<13$) such as $14Li_2O$-$9Al_2O_3$-$38TiO_2$-$39P_2O_5$, lithium lanthanum titanate ($Li_{a3}La_{b3}TiO_3$, $0<a3<2$, $0<b3<3$), lithium germanium thiophosphate ($Li_{a4}Ge_{b4}P_{c2}S_d$, $0<a4<4$, $0<b4<1$, $0<c2<1$, $0<d<5$) such as ($Li_{a4}Ge_{b4}P_{c2}S_d$, $0<a4<4$, $0<b4<1$, $0<c2<1$, $0<d<5$), lithium nitride ($Li_{a5}N_{b5}$, $0<a5<4$, $0<b5<2$) such as $Li_3N$, $SiS_2$-based glass ($Li_{a6}Si_{b6}S_{c3}$, $0<a6<3$, $0<b6<2$, $0<c4<4$) such as $Li_3PO_4$-$Li_2S$—$SiS_2$, $P_2S_5$-based glass ($Li_{a7}P_{b7}S_{c5}$, $0<a7<3$, $0<b7<3$, $0<c5<7$) such as $LiI$—$Li_2S$—$P_2S_5$, or a mixture thereof, may be used.

Gel Polymer Electrolyte

Hereinafter, a gel polymer electrolyte according to the present invention will be explained.

According to an embodiment of the present invention, a gel polymer electrolyte is prepared using the composition for a gel polymer electrolyte.

The conventional gel polymer electrolyte has a problem that the ionic conductivity thereof is lower than a liquid electrolyte, and the stability and mechanical properties thereof are relatively poor when compared with a solid polymer electrolyte.

However, in the gel polymer electrolyte according to the present invention, a polymer network is formed using an oligomer including unit A including a fluorine-substituted or unsubstituted alkylene having 1 to 5 carbon atoms, units B and B' each independently including an amide group, units C and C' each independently including a (meth)acrylate group, and the ionic conductivity and mechanical properties may thus be improved.

In addition, the composition for a gel polymer electrolyte of the present invention contains an additive. Therefore, when the electrolyte is prepared from the composition for the gel polymer electrolyte, the formation of HF or reaction of HF with the electrolyte may be suppressed, thereby improving the safety of the battery.

Meanwhile, the gel polymer electrolyte according to the present invention is formed by polymerizing a composition for a gel polymer electrolyte according to a commonly known method in the art. Generally, a gel polymer electrolyte may be prepared through in-situ polymerization or coating polymerization.

More specifically, in-situ polymerization is a method of preparing a gel polymer through step (a) for inserting, into a battery case, an electrode assembly composed of a positive electrode, a negative electrode, and a separator disposed between the positive electrode and the negative electrode, and step (b) injecting, into the battery case, the composition for a gel polymer electrolyte according to the present invention and then polymerizing the resultant composition.

The In-situ polymerization reaction in a lithium secondary battery is possible via E-beam, γ-rays, and room temperature/high temperature aging process, and according to an embodiment of the present invention, the in-situ polymerization may be performed by thermal polymerization or photopolymerization. In particular, a polymerization time takes approximately 2 minutes to approximately 12 hours, a thermal polymerization temperature may be 30° C. to 100° C., and photopolymerization temperature may be a room temperature (5° C. to 30° C.).

More specifically, the in-situ polymerization reaction in a lithium secondary battery is performed to form a gel polymer electrolyte by injecting the composition for a gel polymer electrolyte into a battery cell, and then subjecting to gelation via polymerization reaction.

As another method, the gel polymer electrolyte may be prepared in such a way that surfaces of an electrode and a separator are coated with the composition for a gel polymer electrolyte, is hardened (gelated) using heat or light such as ultraviolet (UV) light, an electrode assembly is then prepared by winding or stacking an electrode and/or a separator on which a gel polymer electrolyte is formed the electrode assembly is inserted into a battery case, and a conventional liquid electrolyte is re-injected thereinto.

Lithium Secondary Battery

Next, the lithium secondary battery according to the present invention will be explained. A secondary battery according to another embodiment of the present invention includes a negative electrode, a positive electrode, a separator disposed between the positive electrode and the negative electrode, and a gel polymer electrolyte. The gel polymer electrolyte is the same as described above, and particular explanation thereof will be omitted.

Positive Electrode

The positive electrode may be prepared by coating on a positive electrode current collector with a positive electrode mixture slurry including a positive electrode active material, a binder, a conductive agent, a solvent, or the like.

The positive electrode current collector is not particularly limited so long as having conductivity without causing chemical changes in the battery, and, for example, may employ stainless steel, aluminum, nickel, titanium, fired carbon, or aluminum or stainless steel that is surface-treated with carbon, nickel, titanium, silver, or the like.

The positive electrode active material is a compound capable of reversibly intercalating and deintercalating, and may specifically include a lithium composite metal oxide including lithium and one or more metals such as cobalt, manganese, nickel and aluminum. More specifically, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y1}Mn_{Y1}O_2$ (where $0<Y1<1$), $LiMn_{2-z1}Ni_{z1}O_4$ (where $0<Z1<2$), etc.), a lithium-nickel-cobalt-based oxide (e.g., $LiNi_{1-Y2}Co_{Y2}O_2$ (where $0<Y2<1$), etc.), a lithium-manganese-cobalt-based oxide (e.g., $LiCo_{1-Y3}Mn_{Y3}O_2$ (where $0<Y3<1$), a $LiMn_{2-z2}Co_{z2}O_4$ (where $0<Z2<2$), etc.), a lithium-nickel-manganese-cobalt-based oxide (e.g., $Li(Ni_{p1}Co_{q1}Mn_{r1})O_2$ (where $0<p1<1$, $0<q1<1$, $0<r1<1$, and $p1+q1+r1=1$, etc.), a $Li(Ni_{p2}Co_{q2}Mn_{r2})O_4$ (where $0<p2<2$, $0<q2<2$, $0<r2<2$, $p2+q2+r2=2$), etc.), or a lithium-nickel-cobalt-transition metal (M) oxide (e.g., $Li(Ni_{p3}Co_{q3}Mn_{r3}M_{S1})O_2$ (where M is selected from the group consisting of Al, Fe, V, Cr, Ti, Ta, Mg and Mo, and p3, q3, r3 and s1 are atomic fractions of each independent elements, wherein $0<p3<1$, $0<q3<1$, $0<r3<1$, $0<s1<1$, and $p3+q3+r3+s1=1$), etc.), and may include any one thereof or a compound of two or more thereof.

Among the above-listed compounds, in terms of increasing the capacity characteristics and stability of a battery, the lithium composite metal oxide may be $LiCoO_2$, $LiMnO_2$, $LiNiO_2$, a lithium nickelmanganesecobalt oxide (e.g., $Li(Ni_{0.6}Mn_{0.2}Co_{0.2})O_2$, $Li(Ni_{0.5}Mn_{0.3}Co_{0.2})O_2$, or a $Li(Ni_{0.8}Mn_{0.1}Co_{0.1})O_2$, etc.), or a lithium nickelcobaltaluminum oxide (e.g., $LiNi_{0.8}Co_{0.15}Al_{0.05}O_2$, etc.), or the like, and when considering that the remarkably improved effect according to the control of the types and content ratio of constituent elements which form the lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.5}Co_{0.15})O_2$ or $Li(Ni_{0.8}Mn_{0.1}Co_{0.1})O_2$, or the like, and may include any one thereof or a mixture of two or more thereof.

The positive electrode active material may be included in an amount 60 to 98 wt %, preferably 70 to 98 wt %, and more preferably 80 to 98 wt %, based on a total solid content of the positive electrode mixture slurry excluding the solvent.

The binder is a component that assists in binding between the active material and the conductive agent, etc. and in binding with the current collector.

Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene (PE), polypropylene, an ethylene-propylene-diene terpolymer (EPDM), a sulfonated EPDM, a styrene-butadiene rubber, a fluorine rubber, various copolymers, and the like.

Typically, the binder may be included in an amount of 1 to 20 wt %, preferably 1 to 15 wt %, and more preferably 1 to 10 wt %, based on the total weight of the solid content of the positive electrode mixture slurry excluding the solvent.

The conductive agent is a component for further improving conductivity of the positive electrode active material.

Any conductive agent, so long as having a conductivity without causing chemical changes in the battery, may be used without particular limitation, and may employ, for example, a conductive material, such as: graphite; carbon-based materials such as carbon black, acetylene black, Ketjen black, channel black, furnace black, lamp black, or thermal black; conductive fibers such as carbon fibers or metal fibers; metal powder such as carbon fluoride powder, aluminum powder, and nickel powder; conductive whiskers such as zinc oxide whiskers and potassium titanate whiskers; conductive metal oxide such as titanium oxide; or polyphenylene derivatives. Specific examples of a commercially available conductive agent include acetylene black-based products such as Chevron Chemical Company or Denka black (Denka Singapore Private Limited), Gulf Oil Company, Ketjen black, EC-based (Armak Company products), Vulcan XC-72 (Cabot Company products), and Super P (Timcal Co. products).

The conductive agent may be commonly included in an amount of 1 to 20 wt %, preferably 1 to 15 wt %, and more preferably 1 to 10 wt %, based on the total weight of the solid content of the positive electrode mixture slurry excluding the solvent.

The solvent may include an organic solvent such as N-methyl-2-pyrrolidone (NMP), and may be used in an amount satisfying a desirable viscosity is obtained when the positive electrode active material, and optional binder and the conductive agent are included. For example, the solvent may be included such that the concentration of the solid content, which includes the positive electrode active material, and the optionally included binder and conductive agent, may be 50 to 95 wt %, preferably 70 to 95 wt %, and more preferably 70 to 90 wt %.

Negative Electrode

The negative electrode may be produced by coating a negative electrode current collector with a negative electrode mixture slurry including a negative electrode active material, a binder, a conductive agent and a solvent electrode current collector, or may use a carbon (C) electrode or a metal itself as a negative electrode.

For example, the negative electrode current collector is coated with the negative electrode mixture slurry, and the negative electrode current collector generally has a thickness of 3 to 500 μm. The negative electrode current collector is not particularly limited as long as it has a high conductivity without causing chemical changes in the battery, and may use, for example, copper, stainless steel, aluminum, nickel, titanium, fired carbon, copper or stainless steel which is surface-treated with carbon, nickel, titanium, silver, or the like, an aluminum-cadmium alloy, or the like. In addition, as in the positive electrode current collector, the negative electrode current collector may have fine irregularities on the surface thereof to improve the bonding strength of a negative electrode active material, and the negative electrode current collector may be used in various shapes such as a film, a sheet, a foil, a net, a porous body, a foam body, and a non-woven fabric body.

The negative electrode active material may be, for example, one kind or at least two kinds selected from the group consisting of natural graphite, artificial graphite, a carbonaceous material; a lithium-containing titanium composite oxide (LTO), metals (Me): Si, Sn, Li, Zn, Mg, Cd, Ce, Ni or Fe; an alloy of the metals (Me); an oxide (MeOx) of the metals (Me); and a complex of the metals (Me) and carbon.

The negative electrode active material may be included in an amount of 80 to 99 wt %, preferably 85 to 99 wt %, and more preferably 90 to 98 wt % based on the total weight of the solid content of the negative electrode mixture slurry excluding the solvent.

The binder is a component that assists in binding between a conductive agent, an active material, and a current collector. Examples of such binder may include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluorine rubber, and various copolymers thereof, or the like.

The binder may be commonly included in an amount of 1 to 20 wt %, preferably 1 to 15 wt %, and more preferably 1 to 10 wt %, based on the total weight of the solid content of the negative electrode mixture slurry excluding the solvent.

The conductive agent is a component for further improving conductivity of the negative electrode active material. Such conductive agent is not particularly limited as long as it has conductivity without causing chemical changes in the battery, and may employ, for example, a conductive agent, such as: graphite such as natural graphite and artificial graphite; carbon black such as acetylene black, Ketjen black, channel black, furnace black, lamp black, and thermal black; conductive fibers such as carbon fibers and metal fibers; metal powder such as carbon fluoride powder, aluminum powder, and nickel powder; conductive whiskers such as zinc oxide whiskers and potassium titanate whiskers; conductive metal oxide such as titanium oxide; or polyphenylene derivatives, or the like, may be used.

The conductive agent may be included in an amount of 1 to 20 wt %, preferably 1 to 15 wt %, and more preferably 1 to 10 wt %, based on the total weight of the solid content of the negative electrode mixture slurry excluding the solvent.

The solvent may include water or an organic solvent, such as N-methyl-2-pyrrolidone (NMP), and may be used in an amount satisfying a desirable viscosity when the negative electrode active material, and an optional binder and a conductive agent are included. For example, the solvent may be included such that the concentration of the solid content, which includes the negative electrode active material, and the optionally included binder and conductive agent, may be 50 to 95 wt %, and preferably 70 to 90 wt %.

When metal itself is used as the negative electrode, the negative electrode may be formed from a metal thin film itself or prepared by physically bonding, rolling or vapor depositing the metal on the negative electrode current collector. Electro deposition or chemical vapor deposition may be used as deposition technique.

For example, the metal thin film itself or a metal formed on the negative electrode current collector through binding/rolling/depositing may include one metal or an alloy of two metals selected from the group consisting of lithium (Li), nickel (Ni), tin (Sn), copper (Cu), and indium (In).

Separator

In addition, a separator may use a typically used porous polymer film, which is conventionally used as a separator. The separator may use, alone or in a laminated form, a porous polymer film formed from, for example, a polyolefin-based polymer, such as an ethylene homopolymer, a propylene homopolymer, an ethylene/butene copolymer, an ethylene/hexene copolymer, and an ethylene/methacrylate copolymer, or may use a typical porous non-woven fabric, for example, a non-woven fabric formed of high melting point glass fibers, or polyethylene terephthalate fibers. However, the separator is not limited thereto.

The outer shape of the lithium secondary battery of the present invention is not particularly limited, and thus a cylindrical shape using a can, a prismatic shape, a pouch shape, or a coin shape, may be used.

According to another example of the present invention, a battery module including the lithium secondary battery as a unit cell and a battery pack including the same, are provided. Since the battery module and the battery pack include the secondary battery having high capacity, high rate capability characteristics, and may thus be used as a power source of medium- to large-sized devices including an electric vehicle, a hybrid electric vehicle, a plug-in hybrid electric vehicle, and a power storage system.

Mode for Carrying Out the Invention

Hereinafter, the present invention will be described in more detail through the particular examples. However, the examples below are only for helping the understanding of the present invention and should not be construed to limit the scope of the present invention. It would be obvious to a person skilled in the art that various changes and modifications are possible within the scope of this description and the technical spirit and such changes and modifications definitely are included in the scope of the attached claims.

EXAMPLES

1. Example 1

(1) Preparation of Composition for Gel Polymer Electrolyte

A composition for gel polymer electrolyte was prepared by mixing ethylene carbonate (EC), and ethyl methyl carbonate (EMC) at a volume ratio of 3:7, adding 0.7 M of $LiPF_6$, and 0.3 M of LiFSI to prepare a mixed solvent, and then adding, into 91.98 g of the prepared mixed solvent, 5 g of the oligomer represented by Formula 1-5 (weight-averaged molecular weight of 5000), and as additives, 0.2 g of N,N'-dicyclohexylcarbodiimide, and 0.02 g of a polymerization initiator (AIBN), and, as other additives, 1.5 g of vinylene carbonate (VC), 0.5 g of propane sultone (PS), and 1 g of ethylene sulfate (ESa).

(2) Manufacture of Lithium Secondary Battery

A positive electrode mixture slurry was prepared by adding, into N-methyl-2-pyrrolidone (NMP) as a solvent, 94 wt % of $LiNi_{1/3}Co_{1/3}Mn_{1/3}O_2$ (NCM) as a positive electrode active material, 3 wt % of carbon black as a conductive agent, and 3 wt % of PVDF as a binder. An aluminum (Al) thin film having a thickness of about 20 μm as a positive electrode current collector, was coated with the positive electrode mixture slurry and dried, and then roll-pressed to prepare a positive electrode.

A negative electrode mixture slurry was prepared by adding, into NMP as a solvent, 96 wt % of carbon powder as a negative electrode active material, 3 wt % of PVDF as a binder, and 1 wt % of carbon black as a conductive agent. An copper (Cu) thin film having a thickness of about 10 as a negative electrode current collector, was coated with the negative electrode mixture slurry and dried, and then roll-pressed to prepare a negative electrode.

An electrode assembly was prepared using the positive electrode, the negative electrode, and a separator formed of three layers of polypropylene/polyethylene/polypropylene (PP/PE/PP), the prepared composition for a gel polymer electrolyte was injected into the electrode assembly, the resultant mixture was left standing for 2 days, and the battery was heated at 60° C. for 24 hours to manufacture a lithium secondary battery including the gel polymer electrolyte.

2. Example 2

A lithium secondary battery including a gel polymer electrolyte was manufactured in the same manner as in Example 1 except that, as an additive, 0.5 g of 1,1,3,3,3-hexamethyldisilazane was used instead of 0.2 g of N,N'-dicyclohexylcarbodiimide unlike Example 1.

3. Example 3

A lithium secondary battery including a gel polymer electrolyte was manufactured in the same manner as in Example 1 except that 2 g of succinonitrile was added instead of 0.2 g of N,N'-dicyclohexylcarbodiimide unlike Example 1.

4. Example 4

A lithium secondary battery including a gel polymer electrolyte was manufactured in the same manner as in Example 1 except that 0.5 g of 1,1,3,3,3-hexamethyldisilazane, 2 g of succinonitrile, and 2 g of adiponitrile were added instead of 0.2 g of N,N'-dicyclohexylcarbodiimide unlike Example 1.

5. Example 5

A lithium secondary battery including a gel polymer electrolyte was manufactured in the same manner as in Example 1 except that 2 g of lithium tetrafluoroborate was added instead of 0.2 g of N,N'-dicyclohexylcarbodiimide unlike Example 1.

Comparative Examples

1. Comparative Example 1

(1) Preparation of Electrolyte

An electrolyte was prepared by mixing ethylene carbonate (EC) and ethyl methyl carbonate (EMC) at a volume ratio of 3:7, and adding 0.7 M of $LiPF_6$ and 0.3 M of LiFSI, and then adding, as other additives, 1.5 g of vinylene carbonate (VC), 0.5 g of propane sultone (PS), and 1 g of ethylene sulfate (ESa).

(2) Manufacture of Lithium Secondary Battery

A positive electrode mixture slurry was prepared by adding into N-methyl-2-pyrrolidone (NMP) as a solvent, 94 wt % of $LiNi_{1/3}Co_{1/3}Mn_{1/3}O_2$ (NCM) as a positive electrode active material, 3 wt % of carbon black as a conductive agent, and 3 wt % of PVDF as a binder. An aluminum (Al) thin film having a thickness of about 20 μm, as a positive electrode current collector, was coated with the positive electrode mixture slurry and dried, and then roll-pressed to prepare a positive electrode.

A negative electrode mixture slurry was prepared by adding into NMP as a solvent, 96 wt % of carbon powder as a negative electrode active material, 3 wt % of PVDF as a binder, and 1 wt % of carbon black as a conductive agent. An copper (Cu) thin film having a thickness of about 10 μm, as a negative electrode current collector, was coated with the negative electrode mixture slurry and dried, and then roll-pressed to prepare a negative electrode.

A lithium secondary battery was manufactured using the positive electrode, the negative electrode, and a separator formed of three layers of polypropylene/polyethylene/polypropylene (PP/PE/PP), and the prepared electrolyte was injected into the electrode assembly.

2. Comparative Example 2

A lithium secondary battery including a gel polymer electrolyte was prepared in the same manner as in Example 1 except that 5 g of an acrylate-based oligomer composed of dipentaerythritol pentaacrylate was used as an oligomer instead of 5 g of the oligomer of Formula 1-5 unlike Example 1.

3. Comparative Example 3

A lithium secondary battery including a gel polymer electrolyte was manufactured in the same manner as in Example 1 except that no additive was used unlike Example 1.

Experimental Examples

1. Experimental Example 1

The lithium secondary batteries manufactured according to Examples 1 to 5 and Comparative Examples 1 to 3 were set to have a state of charge (SOC) of 50% at 25° C., and were then discharged at a rate of 2.5 C rate using discharge pulse for 10 seconds, and then a resistance value for each lithium secondary battery was checked through the resulting voltage drop. As the results, the measured resistance values and voltage drop values are presented in Table 1 below.

TABLE 1

|  | Resistance (mohm) | Voltage drop (V) |
|---|---|---|
| Example 1 | 40 | 0.10 |
| Example 2 | 48 | 0.12 |
| Example 3 | 60 | 0.15 |
| Example 4 | 68 | 0.17 |
| Example 5 | 71 | 0.18 |
| Comparative Example 1 | 84 | 0.21 |
| Comparative Example 2 | 148 | 0.37 |
| Comparative Example 3 | 100 | 0.25 |

Referring to Table 1, it can be ascertained that the resistance values and also the voltage drop in the batteries manufactured according to the Examples were smaller than those of the batteries manufactured according to the Comparative Examples.

2. Experimental Example 2

Measurement of Rct Resistance of Battery

The lithium secondary batteries manufactured according to Examples 1 to 5 and Comparative Examples 1 to 3 were left to stand for 1 hour at SOC of 50% under 25° C.-temperature conditions, and then the Rct resistance (resistance to charge transfer) of the battery were measured while being scanned from 1 KHz to 1 mHz, and the results are presented in Table 2. The amplitude of the alternating current was 10 mV, and the DC potential of the battery was 3.68 V

TABLE 2

|  | Rct resistance |
|---|---|
| Example 1 | 0.05 |
| Example 2 | 0.06 |

TABLE 2-continued

|  | Rct resistance |
|---|---|
| Example 3 | 0.08 |
| Example 4 | 0.10 |
| Example 5 | 0.12 |
| Comparative Example 1 | 0.15 |
| Comparative Example 2 | 0.27 |
| Comparative Example 3 | 0.19 |

Referring to Table 2, it can be ascertained that the Rct resistance in the batteries manufactured according to the Comparative Examples is greater. It seems that the Rct resistance (interfacial resistance) has been increased due to the side reaction caused by the negative ions of the salt, as compared with the batteries manufactured according to the Examples.

3. Experimental Example 3

Experiment of High-Temperature Safety

With respect to the secondary batteries manufactured according to Examples 1 to 5 and Comparative Examples 1 to 3, each secondary battery was stored at a high temperature for 10 weeks under the conditions that the SOC was 100% (4.15 V), and the storage temperature was 60° C. Thereafter, the battery was set to an SOC of 50% at 25° C. every week for each week, then discharging is performed for 10 seconds with a discharge pulse at 5 C rate to measure the resistance value, and thereafter the resistance variation rate was measured based on the resistance value measured at the beginning (0 week). The results thereof are presented in Table 3 below.

TABLE 3

|  | Resistance variation rate (%) after 10 weeks storage at 60° C. |
|---|---|
| Example 1 | 10.5 |
| Example 2 | 12.0 |
| Example 3 | 12.7 |
| Example 4 | 13.5 |
| Example 5 | 15.2 |
| Comparative Example 1 | 23.0 |
| Comparative Example 2 | 73.2 |
| Comparative Example 3 | 31.0 |

Referring to Table 3, it can be ascertained that the resistance increase rate of the batteries manufactured according to the Examples is significantly lower than that of the batteries manufactured according to the Comparative Examples, at a high temperature.

The invention claimed is:

1. A composition for a gel polymer electrolyte, the composition comprising:
    an oligomer represented by Formula 1-5 below;
    an additive;
    a polymerization initiator; and
    a non-aqueous solvent,
    wherein the additive comprises at least one compound selected from the group consisting of N,N'-dicyclopentylcarbodiimide and N,N'-dicyclohexylcarbodiimide,

[Formula 1-5]

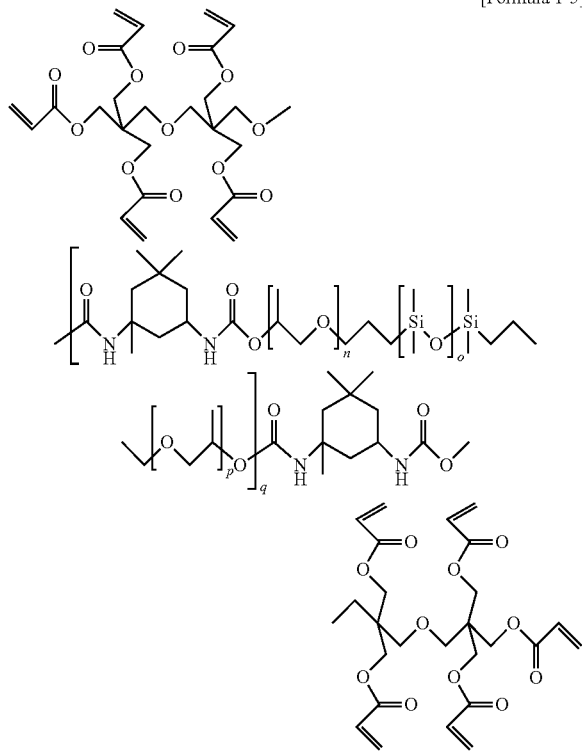

wherein, in Formula 1-5, n, o, and p are each independently an integer of 1 to 30, and q is an integer of 1 to 100, and an amount of the oligomer represented by Formula 1-5 is 0.5 to 20 parts by weight, and an amount of the additive is 0.1 to 30 parts by weight with respect to 100 parts by weight of the composition.

2. The composition for a gel polymer electrolyte according to claim 1, wherein the additive further includes a compound having a Si—N based bond represented by Formula 3,

[Formula 3]

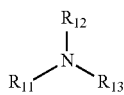

wherein, in Formula 3, $R_{11}$ is hydrogen or a silyl group that is substituted with an alkyl group having 1 to 5 carbon atoms or unsubstituted, $R_{12}$ and $R_{13}$ are each independently one selected from the group consisting of hydrogen, a substituted or unsubstituted alkyl group having 1 to 5 carbon atoms, a hetero-atom-substituted or unsubstituted alkyl group having 1 to 5 carbon atoms, and a silyl group that is substituted with an alkyl group having 1 to 5 carbon atoms or unsubstituted, and the hetero-atom may be one selected from the group consisting of oxygen (O), nitrogen (N), and sulfur (S).

3. The composition for a gel polymer electrolyte according to claim 2, wherein the compound having a Si—N-based bond comprises at least one compound selected from the group consisting of 1,1,1,3,3,3-hexamethyldisilazane, heptamethyldisilazane, N,N-diethylaminotrimethylsilane, and N,N,O-tris(trimethylsilyl)hydroxyamine.

4. A gel polymer electrolyte prepared using a composition for the gel polymer electrolyte according to claim 1.

5. A lithium secondary battery comprising:
a positive electrode;
a negative electrode;
a separator disposed between the positive electrode and the negative electrode; and
the gel polymer electrolyte according to claim 4.

6. The composition for a gel polymer electrolyte according to claim 1, wherein the amount of the oligomer represented by Formula 1-5 is 5 to 20 parts by weight, and the amount of the additive is 2 to 30 parts by weight with respect to 100 parts by weight of the composition.

7. The composition for a gel polymer electrolyte according to claim 1, wherein the amount of the oligomer represented by Formula 1-5 is 1.5 to 20 parts by weight with respect to 100 parts by weight of the composition.

8. The composition for a gel polymer electrolyte according to claim 1, wherein the additive comprises N,N'-dicyclopentylcarbodiimide.

9. The composition for a gel polymer electrolyte according to claim 1, wherein the additive comprises N,N'-dicyclohexylcarbodiimide.

10. The composition for a gel polymer electrolyte according to claim 1, wherein an amount of the polymerization initiator is 0.01 to 5 parts by weight with respect to 100 parts by weight of the composition.

11. The composition for a gel polymer electrolyte according to claim 1, wherein an amount of the polymerization initiator is 0.05 to 5 parts by weight with respect to 100 parts by weight of the composition.

12. The composition for a gel polymer electrolyte according to claim 1, wherein an amount of the polymerization initiator is 0.1 to 5 parts by weight with respect to 100 parts by weight of the composition.

* * * * *